(12) United States Patent
Thro et al.

(10) Patent No.: US 6,879,584 B2
(45) Date of Patent: Apr. 12, 2005

(54) COMMUNICATION SERVICES THROUGH MULTIPLE SERVICE PROVIDERS

(75) Inventors: Stuart Wells Thro, Owl's Head, ME (US); Nicholas M. Labun, Chicago, IL (US); Shaowei Pan, Lake Zurich, IL (US); John P Sawinski, Flower Mound, TX (US); Jheroen Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 823 days.

(21) Appl. No.: 09/773,825

(22) Filed: Jan. 31, 2001

(65) Prior Publication Data

US 2002/0101858 A1 Aug. 1, 2002

(51) Int. Cl.[7] ............................................... H04L 12/66
(52) U.S. Cl. ..................... 370/352; 370/357; 370/389
(58) Field of Search ............................... 370/352, 353, 370/354, 355, 356, 357, 389, 401, 535, 395.1, 465, 410, 522, 259; 709/227, 228, 200, 223, 220, 221, 229, 204, 225; 455/400; 379/219, 231, 234, 121, 399.01, 142.16, 93.02, 93.23, 142.01, 142.15, 142.05, 142.06, 142.07

(56) References Cited

U.S. PATENT DOCUMENTS

| | | | | |
|---|---|---|---|---|
| 5,208,804 A | | 5/1993 | Wilson et al. ................. 370/30 |
| 5,862,490 A | * | 1/1999 | Sasuta et al. ................. 455/525 |
| 5,987,331 A | | 11/1999 | Grube et al. ................. 455/509 |
| 6,011,909 A | | 1/2000 | Newlin et al. ......... 395/200.57 |
| 6,055,229 A | | 4/2000 | Dorenbosch et al. ....... 370/313 |
| 6,064,887 A | * | 5/2000 | Kallioniemi et al. ........ 455/445 |
| 6,148,198 A | * | 11/2000 | Anderson et al. ......... 455/432.1 |
| 6,269,395 B1 | * | 7/2001 | Blatherwick et al. ....... 709/219 |
| 6,292,481 B1 | * | 9/2001 | Voit et al. ................... 370/352 |
| 6,295,292 B1 | * | 9/2001 | Voit et al. ................... 370/352 |
| 6,487,600 B1 | * | 11/2002 | Lynch ........................ 709/229 |
| 6,505,244 B1 | * | 1/2003 | Natarajan et al. ........... 709/223 |
| 6,539,427 B1 | * | 3/2003 | Natarajan et al. ........... 709/224 |
| 6,584,502 B1 | * | 6/2003 | Natarajan et al. ........... 709/224 |
| 6,678,265 B1 | * | 1/2004 | Kung et al. ................. 370/352 |
| 6,680,935 B1 | * | 1/2004 | Kung et al. ................. 370/352 |
| 6,725,037 B1 | * | 4/2004 | Grootwassink ............. 455/433 |
| 6,728,239 B1 | * | 4/2004 | Kung et al. ................. 370/352 |
| 6,731,630 B1 | * | 5/2004 | Schuster et al. ............. 370/356 |
| 6,732,176 B1 | * | 5/2004 | Stewart et al. .............. 709/227 |
| 2002/0022483 A1 | * | 2/2002 | Thompson et al. ......... 455/439 |
| 2002/0087674 A1 | * | 7/2002 | Guilford et al. ............ 709/223 |

* cited by examiner

*Primary Examiner*—Wellington Chin
*Assistant Examiner*—Jamal A. Fox
(74) *Attorney, Agent, or Firm*—Hisashi D. Watanabe

(57) ABSTRACT

Apparatus and methods using a first service provider such as a WAN cellular service provider to initiate a communications exchange between a plurality of communications units and a second service provider such as WLAN service provider to provide enhanced communications services to the units has been disclosed and described.

49 Claims, 4 Drawing Sheets

COMMUNICATION SERVICES THROUGH MULTIPLE SERVICE PROVIDERS

FIELD OF THE INVENTION

This invention concerns methods and apparatus for providing communications services and more particularly providing such services using a plurality of service providers so as to take advantage of respective provider's capabilities.

BACKGROUND OF THE INVENTION

Wide Area Networking (WAN) systems such as various cellular wireless phone systems are known. These systems by nature and design provide a widely implemented solution for mobility management and geographic tracking of communication units. These systems have proven and been designed to be an effective means of providing communication services such as voice telephony, short messaging, and some moderate rate data communications services with near global geographic coverage.

Certain emerging requirements for communications services necessitate capabilities that will not be supported on such cellular systems. Most multi-media and video services require bandwidths and other capabilities that transcend the capabilities of cellular service providers. Hence, many very wide bandwidth applications and services that are rapidly evolving, for example, on the Internet, have not to date and perhaps will not ever become readily and widely accessible to the mobile or wireless user via a WAN system.

New systems and end user devices or units are being contemplated that provide for or include, respectively, high bandwidth short range networking capabilities, using Wireless Local Area Network (WLAN) technologies such as 802.11b or Bluetooth. These links may allow mobile handsets to establish Internet attachments when they approach a network access point (NAP). These WLAN based systems may create an opportunity for these untethered devices to enjoy high bandwidth services, once reserved for fixed devices. However, the WLAN systems only provide short range coverage, are not widely deployed, or do not provide for user mobility and hence are not generally suitable of providing enhanced services for mobile users over a wide area. What is needed is means and methodologies to integrate the capabilities of WAN and WLAN systems to complete an end-to-end enhanced services vision, including mobility management, dynamic attachment and call management incorporated into an overall system. This invention addresses this need.

BRIEF DESCRIPTION OF THE DRAWINGS

The accompanying figures, where like reference numerals refer to identical or functionally-similar elements throughout the separate views and which are incorporated in and form part of the specification, further illustrate various embodiments in accordance with the present invention and, together with the detailed description, hereinafter below, serve to explain various principles and advantages in accordance with the present invention.

DETAILED DESCRIPTION OF A PREFERRED EMBODIMENT

Figure 1:
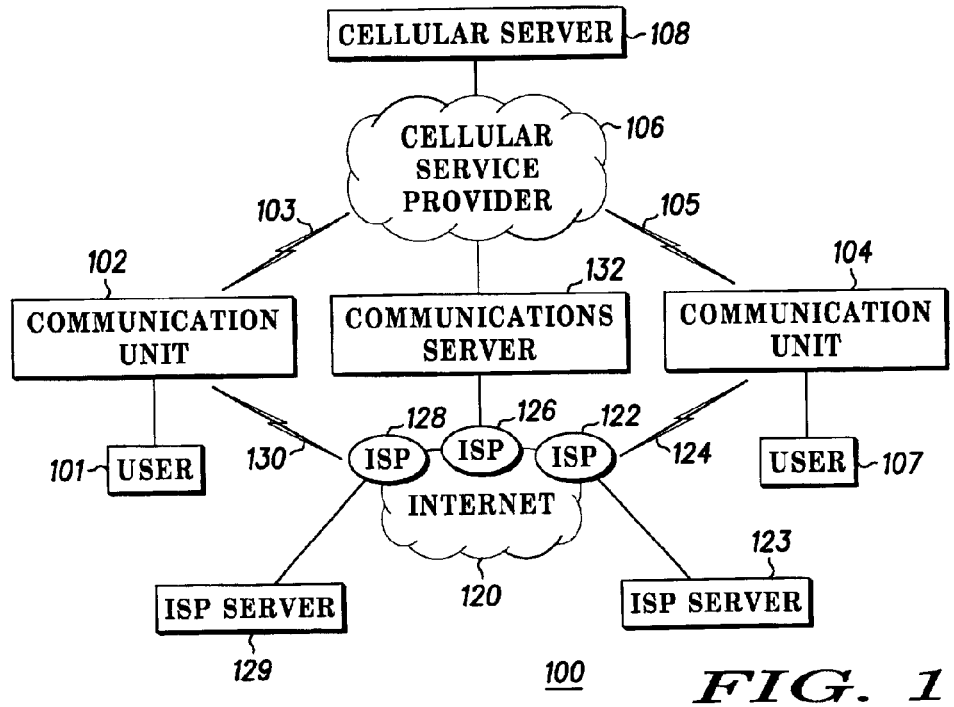
FIG. 1 depicts in block diagram form a preferred embodiment of a plurality of service providers and communications units arranged in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims, including any claims that may be added or such claims as may be amended during the pendency of this application or resultant patent.

The present disclosure generally concerns and deals with one or more embodiments of systems, apparatus, or methods for providing communications services to end users using a plurality of service providers. It is expected that one such service provider can be fairly characterized as a Wide Area Network (WAN) that is ubiquitous and pervasive meaning, for example, relatively inexpensive and widely deployed and particularly adapted to establishing and maintaining a connection to an end user or user device regardless of a present or current and changing location. Known cellular service providers or systems, singularly or in combination, such as Analog Cellular (AMPS, NAMPS, etc), Digital Cellular (TDMA, GSM), Personal Communications Service (PCS) providers using Code Division Multiplex Access (CDMA) technologies, two-way paging or messaging services or equivalents often in combination with the PSTN are examples of such WANs. These systems provide or will likely provide services or communications services that advantageously provide or manage basic call connectivity, mobility, or maintenance duties relatively inexpensively on a more or less global basis.

However these broadly or widely deployed systems provide services that, whatever their strengths, are generally limited and basically unsuited for certain specialized or broadband applications or services now known and now or hereafter being developed. Such services or applications may include, for example, high Quality of Service (QoS) or security or data rate requirements such as encountered in some Ecommerce transactions or pictorial, video, or large database access and retrieval services. Various new communications services such as those promised by wireless Local Area Networks (LANs) (Bluetooth, Home RF, 802.11) with Gateways to the Internet or other wired networks, 3G Universal Mobile Telecommunications System (UMTS), or wired LAN or various other and like high bandwidth, feature rich communications services and equipment are being considered and developed.

However, it is unlikely that in the near to intermediate future that any, much less all, of these systems will be widely deployed and available. Furthermore many of these systems, such as the LANS, are not capable of mobility management (establishing and maintaining communications connections or sessions for mobile units). Additionally even if all of these new communications services were widely available, it may not be practical to build user devices or communications units or selective call communications units, such as cellular phones or handsets, personal organizers, and the like, suitable for taking advantage of the capabilities of all the proposed systems.

However the present disclosure generally contemplates an inventive approach wherein the presently available WAN or cellular system or a service provider with similar strengths and abilities is used to establish or make and preferably manage or control a contact or connection or portion thereof between two or more users. User is more aptly considered to be user devices or communications units of varying form having the capability of being selectively called. User devices would include cellular handsets or phones, personal organizers or computers or other messaging devices with wireless communications and connectivity or similar types of units each suitably modified in accordance with the teachings herein to take advantage of the capabilities of a plurality of communications services. Thereafter or concurrently the communications services that are desired for a communications exchange between these units are determined. Then communications services available from other service providers for each unit are determined or discovered and then available communications services that are compatible with the desired services are selected and the communications exchange is carried out using the plurality of service providers. Note: it may be that only one of the communications units involved in an exchange need additional services. For example, suppose a high bandwidth (3G phone) were involved in setting up an exchange with a legacy or early cellular phone then after contact using the first service provider only the legacy phone would need additional services. As an overview and as further explained below the procedures of ascertaining what services may be required, available, selected, and used can be generally accomplished in a network centric system (intelligence and decisions largely made within the network by a server or processor) or in a peripheral or edge centric system (intelligence or decisions largely made within the peripheral devices or communications units).

One aspect disclosed is a method of facilitating communication services for a communications unit where such services are selected from a plurality of communications service providers. This method is preferably practiced at a receiving or terminating communications unit though the method may also be utilized by a communications server that is part of or associated with each of the multiple service providers and includes the following steps. Receiving at the communications unit or the communications server, using or by way of a first service provider, an indication of a desired communications with a second communications unit. This step of receiving further, preferably, includes receiving an indication of communications services and perhaps affiliation information (Uniform Resource Locator, Phone number, IP or other address, IP port number, or other info needed to contact the second communications unit using these services) corresponding to these services that are desired by the second communications unit for the communications.

Then determining or discovering, in accordance with or reliance upon and responsive to said indication, communications services available from a second service provider suitable for use by the communications unit or the second communications unit. The determining or discovering operation may amount to a database lookup where a database is stored at a communications server or within one of the communications units or to utilizing a service discovery algorithm compatible with the second service provider protocols or reference to user preferences available from varying locations.

Further sending, preferably using the first service provider, an indication of these communications services available from the second service provider to, respectively, the second communications unit or the communications unit possibly by way of the communications server. This sending operation can include sending from the communications unit an acknowledgement of the desired communications services together with affiliation information corresponding to the desired communications services when the receiving unit has such services available even if from a different provider than the originating communications unit. Alternatively the step may include sending an indication of communications services corresponding to but perhaps not completely matching the desired communications services along with alternative services and relevant affiliation information for all such communications services available to the communications unit. In the latter case the method would further include a step of receiving an indication of communications services as selected from the available services by the second communications unit and any additional and relevant affiliation information for the selected services.

By way of example, the step of receiving preferably uses one or more cellular phone service providers or paging providers or the like possibly in combination with the PSTN whereas the operation or process of determining communications services available from a second service provider may include determining communications services available from one or more of an internet service provider, a local area network provider, a broadband service provider, or a 3G service provider. Further the steps of this method may occur while the communications unit and the second communications unit are already participating in a previously established call using the first service provider.

Another aspect disclosed is a further method of facilitating communication services for a communications unit where such services are again selected from a plurality of communications service providers. This method may advantageously be practiced at an originating communications unit or a communications server and includes the following steps. Sending from the communications unit or a communications server on behalf of the communications unit to a second communications unit, using or by way of a first service provider, an indication of a desired communications between the communications units. The step of sending preferably includes sending an indication of communications services desired and relevant corresponding affiliation information from the communication unit to one of the second communications unit or the communications server.

Determining or discovering or otherwise ascertaining, in accordance with or reliance upon and perhaps responsive to the indication, communications services that are available from a second service provider for the second communications unit or the communications unit. This operation may include receiving an acknowledgement of the communications services desired together with affiliation information corresponding to such services. Alternatively the operation can include receiving an indication of communications services that correspond to but perhaps do not match the communications services desired and alternative services along with relevant affiliation information, all such communications services available to the second communications unit. In the latter case a further step of sending to the second communications unit preferably using the first service provider an indication of communications services as selected by the communications unit and relevant affiliation information will be required.

Then initiating communications between the communications units using the communications services available from the second service provider. By way of example this method contemplates a cellular phone service provider or paging service provider or the like as the first service provider where session initiation, management and ultimate control are handled via this service provider. The second service provider is one or more of an internet service provider, a local area network provider, a broadband service provider, and a 3G service provider. As above the additional services from the second service provider may be required and negotiated for in the midst of an ongoing exchange of the first service provider.

One further aspect of the disclosure is a method of selecting communications services for a communications unit once again where such services are selected from a plurality of communications service providers. This method may advantageously be practiced within a system or preferably a communications server and includes the following steps. Initially establishing contact between the communications unit and a second communications unit using a first service provider and known techniques. Next determining or ascertaining, at one of the communications units or the communications server, communications services required for a further higher bandwidth or higher quality communications exchange between the communications unit and the second communications unit.

Then, preferably at a communications server, discovering communications services available from a second service provider, such services suitable for use by the communications unit and the second communications unit for the higher QoS or higher bandwidth demands. Selecting, preferably at the server, the communication services from said first service provider and said second service provider, the communications services selected in accordance with said communications services required for the communications exchange and taking into consideration one of available bandwidth and cost for the communications services.

Note the steps of discovering and selecting may advantageously be undertaken after the communications exchange has been initiated using the first service provider, responsive perhaps to a recognition that better services are required or certainly desired. Although the discovery and selecting steps are preferably undertaken by the communications server it should be noted that these actions are likely being done on behalf of the communications unit or the second communications unit. The communications server is further useful for performing authenticating and authorizing services for the communications unit or the second communications unit to use the communications services that would otherwise possibly not be available to one of the units and may act as a third party reseller of services essentially being billed by the service providers and in turn billing the communications units.

In apparatus form a communications unit, such as cellular phone or other selective call communications unit, that is arranged and constructed for selecting communications services from a plurality of communications service providers is disclosed. This unit includes in combination a user interface such as a keyboard or voice recognition feature for accepting input indicative of desired communications services and a transceiver and controller, coupled to the user interface. The transceiver and controller are collectively operable for discovering communications services corresponding to the desired communications services that are available from a second service provider for a second communications unit. Then establishing, using a first service provider, a communications link between the communications unit and the second communications unit, and sending, preferably using the first service provider, an indication of the desired communications services for a communications exchange between the communications unit and the second communications unit.

The transceiver, under control of the controller, preferably sends the indication of the desired communications services and relevant affiliation information (info, URL, addresses, phone numbers etc., needed to contact the communications unit from the second communications unit) to one of the second communications unit or a communications server. When the communications services that are available are less than or exceed those desired, the controller is operable to select communication services, from the first service provider or the second service provider or both in some combination, in accordance with the desired communications services and control the transceiver to initiate communications with the second communications unit using the communications services that have been selected.

Discovering or determining communications services available from a second service provider may take various forms, such as searching a database for such information or by "negotiating" as further explained below with the second unit preferably using services from the first service provider. For example when desired and available services match, the communications unit by way of the transceiver can receive an acknowledgement of the desired communications services as sent above together with relevant affiliation information (info required to contact the second communications units for various services) corresponding to the desired communications services. If there is not an exact or good match the transceiver will receive an indication of communications services corresponding to said desired communications services and alternative services together with affiliation information, all such communications services available to the second communications unit. Then the communications unit will select or a server may select the communications services from those available and the transceiver further sends an indication of the communications services selected by the communications unit and relevant affiliation information to the second communications unit.

By way of example as noted above the transceiver, preferably sends the indication of the desired communications services and other communications pursuant to establishing the final session using a cellular phone service provider, etc.; and discovers the communications services that are available from one of an internet service provider, a local area network provider, a broadband service provider, and a 3G service provider.

In a further apparatus embodiment a communications unit is disclosed that is arranged and constructed for selecting communications services from a plurality of communications service providers. In this instance the communications unit is preferably the receiving or terminating unit in a communications session originated or requested by a second communications unit or on behalf of a second communications unit. The communications unit includes a user interface for providing user output and accepting input relevant to communications services and coupled thereto a transceiver and a controller. The transceiver and controller are operable for: receiving, using a first service provider, an indication of a desired communications for a communications exchange between the communications unit and a second communications unit; discovering communications services available from a second service provider for the communications unit, and sending, preferably using the first communications services provider, an indication of the available communications services to the second communications unit.

The communications unit or specifically the transceiver under control of the controller preferably sends an acknowledgement of the desired communications together with relevant affiliation information corresponding to the available communications services at least where a match between available and desired is found. Alternatively the transceiver sends an indication of communications services corresponding to the desired communications services and alternative services, all such communications services available to the communications unit and if so preferably receives an indication of communications services selected by one of the second communications unit or a communications server. As above the transceiver preferably receives the indication of the desired communications using a cellular phone service provider; and discovers communications services available from one or more of an internet service provider, a local area network provider, a broadband service provider, and a 3G service provider.

In an additional embodiment a communications server is disclosed that is arranged and constructed for selecting communications services from a plurality of communications service providers. The server includes a processing unit; and a memory operably coupled to the processing unit, wherein the memory stores programming instructions that, when read by the processing unit, causes the processing unit to;

a) receive, using a first protocol of a first service provider, an indication of a desired communications from a communication unit, b) establish, responsive to the indication and using the first protocol, contact with a second communication unit, c) determine, responsive to the indication, first communication services desired for a communication exchange between the communications unit and the second communications unit, d) discover what second communications services, using a second protocol of a second service provider, are available to the second communications unit, and e) select the communications services using the first protocol and using the second protocol to support the communications exchange between the communications unit and the second communications unit.

The communications server, specifically processing unit preferably will further receive a response from the second communications unit and sends a response to the communication unit using the first protocol or second protocol. The processing unit may further establish, responsive to the indication and using the first protocol, contact with a plurality of additional communications units.

The process of determining first communications services may be accomplished by the processing unit by analysis of the indication of a desired communications or analysis of one of user preferences and type of information to be communicated.

The process of discovering the second communications services is preferably accomplished by the processing unit interrogating each participating communications unit to determine what communications services are available locally to each participating unit and identifying a set of communications services that are compatible with these available communications services. Discovery of appropriate communications services may be accomplished by the processor facilitating an information exchange regarding locally available services between the communications unit and the second communications unit. In any event, the processing unit is caused to select the communications services based upon; one or more criteria such as knowledge of information to be communicated, a set of communications services available to the communications unit and the second communications unit or other participating units, and preferences of users of the participating communications units.

Turning to the illustrations, FIG. 1 depicts a plurality of service providers (100) providing communications services to communications units 102,104. In the interest of brevity and avoiding unnecessarily obscuring the advantages and principles of the present invention it will be understood that FIG. 1 is greatly simplified. FIG. 1 depicts a first service provider 106, specifically a cellular service provider including a cellular server or switch 108. It is understood that the first service provider may be any one or any combination (not depicted) of generally known WAN service providers operating as generally known including varying forms of cellular service providers such as those mentioned earlier above and may include some portion of the PSTN (not depicted). For example, the PSTN may be used as the interface between diverse cellular providers or one of the communications units may be connected by way of the PSTN. The basic requirement from the first service provider is that pervasive coverage be provided so as to provide mobility and call management and control sufficient that a connection can be established and maintained between the communications units under most or all circumstances. As depicted, a user 101 using communications unit 102 communicates by way of a radio link 103 with or through the service provider 106 using a suitable air interface protocol(s) and thus by way of a radio link 105 using appropriate protocol(s) to communications unit 104 and thus user 107.

Furthermore, FIG. 1 depicts a second service provider 120, specifically the Internet with ISPs (internet service providers) 122, 126, 128. ISP 122 is shown with an associated ISP server 123 as providing a connection or gateway to the Internet, depicted as wireless through a radio link 124, for communications unit 104. Similarly ISP 128 and associated ISP server 129 provide a connection or gateway to the Internet, depicted as wireless through a radio link 130, for communications unit 102.

These wireless connections are preferably provided by an RF or radio based wireless LAN or WLAN technology such as those defined by the Bluetooth, Home RF, or 802.11 standards. In accordance with the present invention WLAN technologies are employed to extend the communications services of WAN systems. However, the short range and lack of widespread deployment of WLAN access cells makes WLAN systems alone too unreliable for use in providing wide area mobility tracking and support for core voice and messaging services. The optimum user experience can be provided by integrating the strengths of these systems which advantageously overcomes their relative weaknesses. Thus, FIG. 1 notwithstanding, whether a communications unit has access to any such communications service much less which service is presently problematic.

Additionally FIG. 1 depicts a communications server 132 coupled by ISP 126 to the second service provider 120 or Internet and to the first service provider or cellular system 106. As will be discussed further below this server operates in one embodiment on behalf of the communications units to facilitate selection of communications services from the plurality of service providers and may operate essentially as a reseller providing, for example, authorization, authentication, and billing services for the units. The communications units 102, 104 as depicted need to be capable of communicating using multiple protocols, frequencies and so on in order to operate on the disparate service providers although it is not expected that each unit will be identical with identical abilities. For example communications unit 102 may be arranged to operate on traditional cellular services and a Bluetooth based LAN while communications unit 104 could operate on a CDMA based network such as defined by IS95 and a Home RF based LAN.

Figure 2:
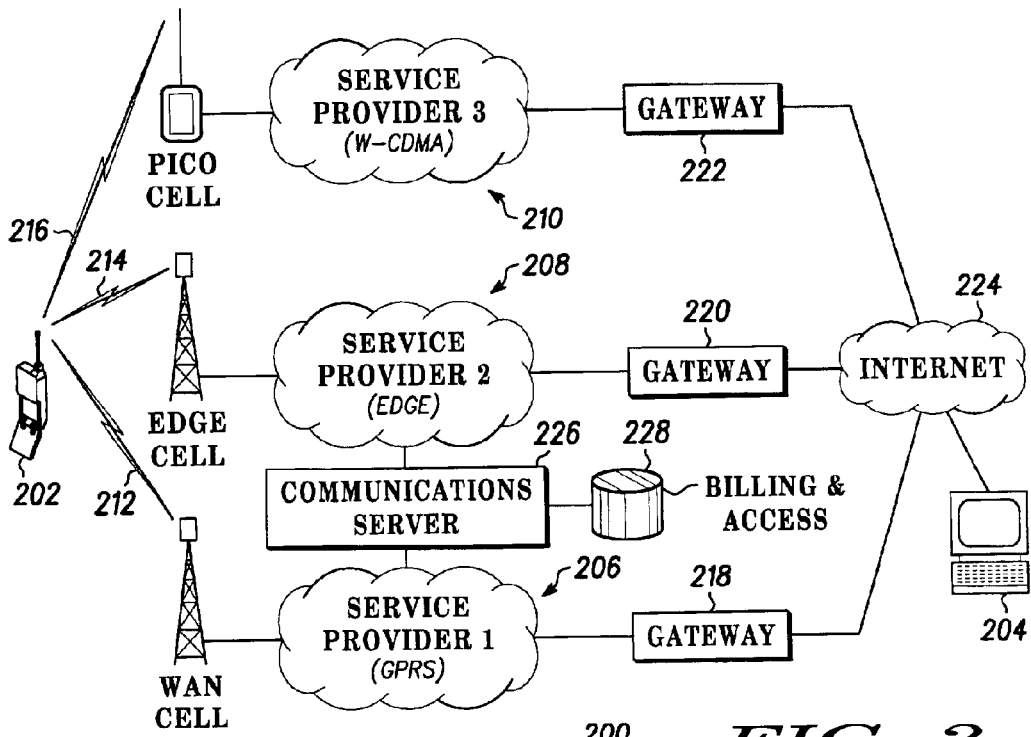
FIG. 2 depicts a further embodiment at a system level of service providers and communications unit in accordance with the present invention.

Referring now to FIG. 2 an alternative and simplified block diagram embodiment in accordance with the present invention is depicted. Again a plurality of service providers 200 in simplified form is depicted together with communications units 202, 204. The service providers include service provider 1, specifically a GPRS WAN 206 that is suitable for establishing and maintaining packet data based calls and is expected to be widely deployed in much of the world but which will have limited data transport capabilities. Service provider 2 shown as an EDGE based network 208 will be suitable for handling relatively heavy loads such as pictures or large databases but may not be widely deployed or not soon widely deployed. Service provider 3 depicted as a wideband CDMA system 210 is suitable for even larger loads, for example video bandwidths but will be even later and more sparsely deployed.

Communications unit 202 is depicted as a portable device or handset arranged to communicate with either of the three service providers by, respectively, radio links 212, 214, 216 (shown with progressively wider symbols depicting wider and wider bandwidths). Service provider 3 is depicted as a wideband (W)-CDMA system and it is or is coupled to a WLAN system depicted by a pico-cell (very limited geographic coverage area) such as a Bluetooth based Network Access Point (NAP) or the like, to the radio link 216. The respective service providers are coupled by gateways 218, 220, 222 to the Internet 224 and thus to communications unit 204, shown as a fixed computer and presumably suitable for whatever bandwidth signals are presented. Here again it is expected that the present invention will allow a given communications unit to take advantage of the respective strengths of the respective service providers and work around their respective weaknesses.

Lastly FIG. 2 depicts a communications server 226 coupled to service providers 206, 208 and a billing and access database 228. Again this server in one embodiment may be used to facilitate selection of appropriate communications services from amongst the service providers or may act as a reseller of services providing for example access authorization, authentication, and billing services to the respective communications units.

Figure 3:
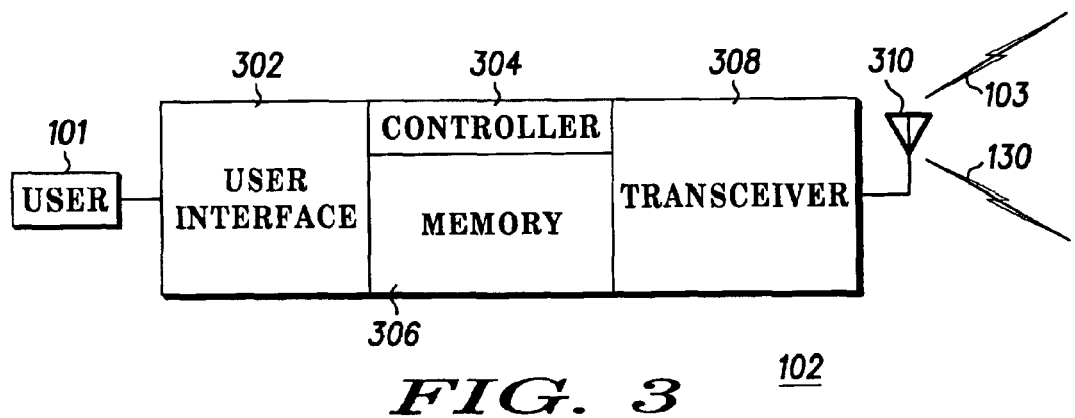
FIG. 3 depicts a simplified but more detailed block diagram of a communications unit suitable for deployment in the FIG. 1 or 2 block diagrams and in accordance with the present invention.

Referring to FIG. 3 a simplified block diagram of a communications unit 102 in accordance with the present invention is depicted. The communications unit is shown with the user 101 coupled to the radio link 103. The communications unit 102 includes a user interface such as a keyboard, display, voice recognition interface or the like as is generally known. This interface is coupled to a controller 304 and thus a transceiver 308. The transceiver is shown coupled to an antenna 310 and the controller is coupled to a memory 306.

The controller 304 in preferred form is a software driven processor, such as microprocessor or digital signal processor based unit together with support electronics but could be a specialized hardware or custom integrated circuit unit as the designer may prefer. The controller operates to control the transceiver 308 to operate in accordance with the protocols of the various service providers and the inventive principles disclosed herein as well as interface the user with the service providers by way of the user interface.

The transceiver 308 includes various transmitters, receivers, encoders, decoders, and so on such that the communication unit may be caused to access and operate on a plurality of service providers such as service providers 106, 120 or the service providers of FIG. 2. Antenna 310 together with transceiver 308 must be suitable for operation of RF link 103, 130 and so on.

Memory 306 may be various forms of RAM, ROM, and the like suitable for storing software programs, unit specific information, databases and the like that in operation cause the controller, thus the communications unit to operate in accordance with the inventive principles disclosed herein. It is recognized that the description provided here is much simplified and that significant non inventive activity may be required but it is believed that one of ordinary skill with available public information, the information provided and in view of the inventive principles disclosed will be readily capable of making and using the inventions claimed.

Figure 4:
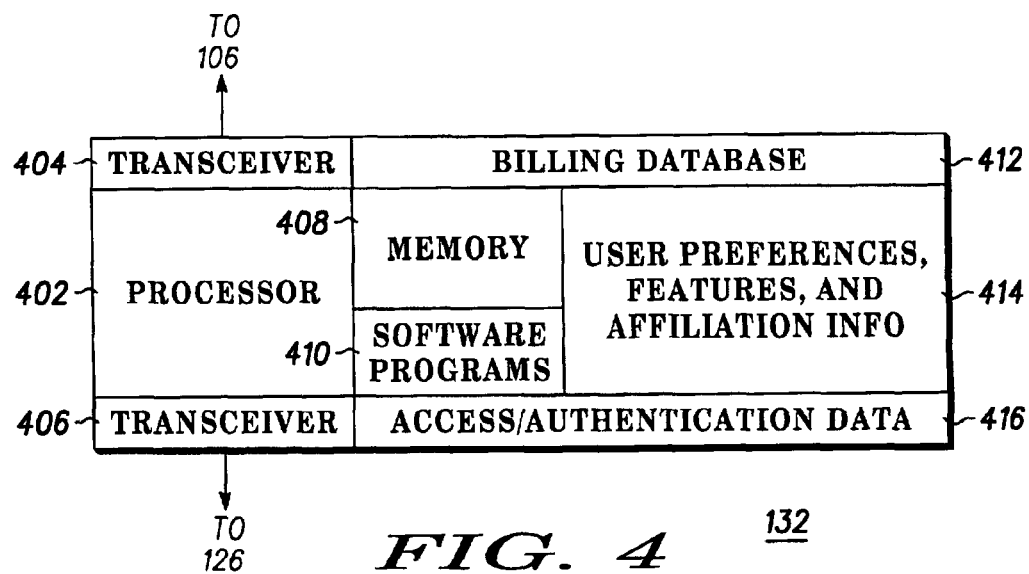
FIG. 4 depicts a more detailed but simplified block diagram of the communications server of FIG. 1 or 2 in accordance with the present invention.

Referring to FIG. 4 a more detailed but simplified block diagram of communications server 132 is depicted. Server 132 is similar in function to communications server 226 of FIG. 2. Any description here of the structure, function, purpose and operation of communications server 132 would be analogous for server 226. Communications server 132 while depicted as single server separate from the cellular server and ISP servers, etc. may in fact be co-located with either or may physically be a portion of one or the other or may have functionality distributed throughout multiple servers.

Communications server 132 includes a processor 402 that is shown coupled to transceivers 404, 406, memory 408 including software programs 410, databases including a billing database 412, a user preference, feature, and affiliation information database 414, and an access authorization and authentication database 416. The processor 402 is computer or microprocessor based and software driven to perform interface and control functions required for server functionality as is generally known. Appropriate servers are available from various manufacturers such as Cisco, etc. but would require software to be modified or developed in accordance with the inventive principles herein disclosed. The transceivers 404, 406 are generally known but may vary in accordance with the physical and logical interface standards or protocols utilized by the respective service provider networks 106, 126. These units may be optical transceivers or other relatively broadband transceivers and are likely to use TCP/IP packet type protocols.

The memory 408 as generally known includes RAM and mass storage media such as hard drive based storage and likely backup storage such as magnetic tape. The memory in addition to the various databases includes software programs 410 comprised of programming instructions that when read and executed cause the processor to operate in accordance with the inventive principles disclosed herein.

Figure 5:
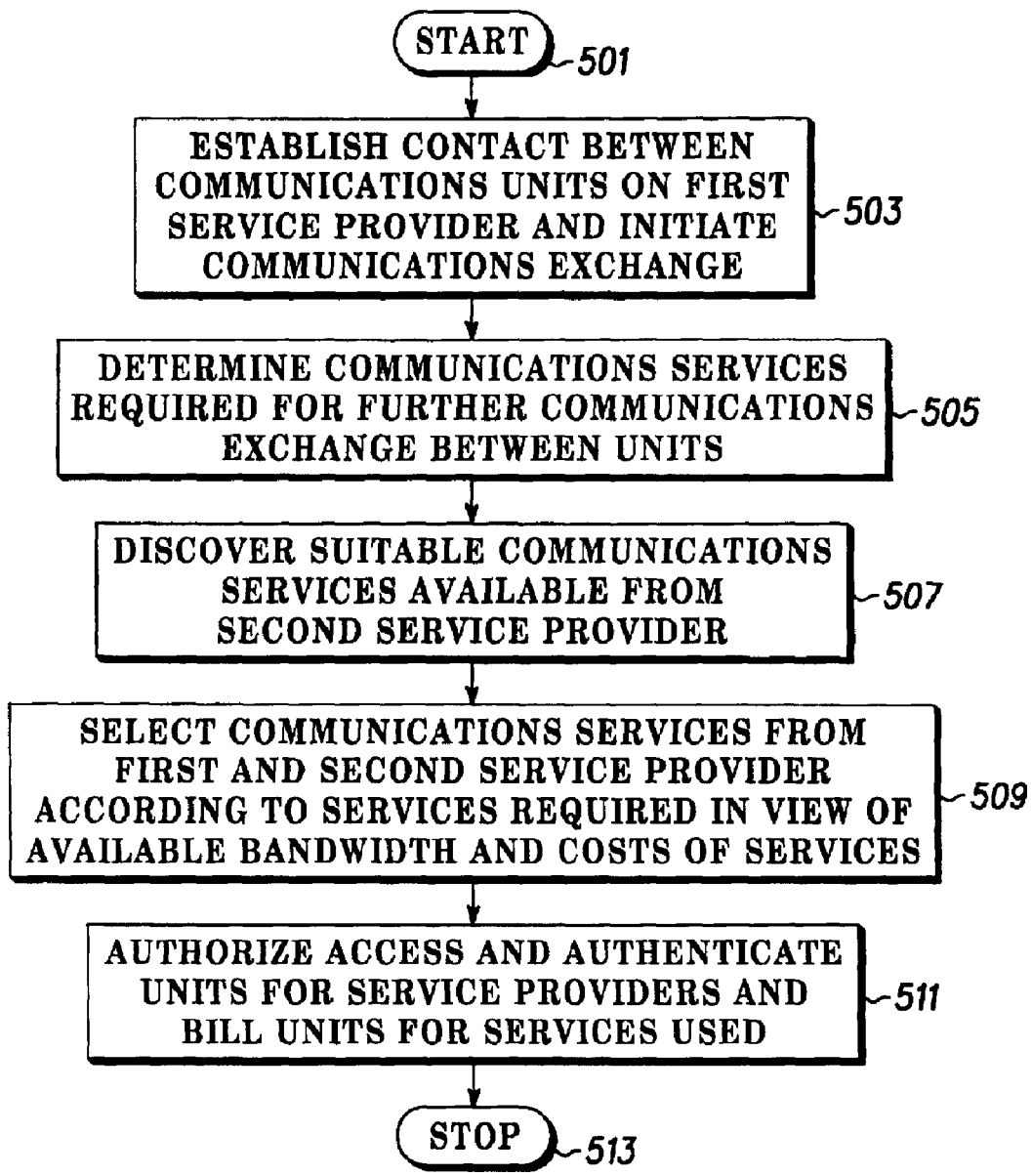
FIG. 5 depicts an overview process flow chart of a method of providing communications services in accordance with the present invention.

Referring to FIG. 5 a process flow chart of a method 500 of selecting communications services for a communications unit is depicted. Such services are selected from a plurality of communications service providers and the method starts at step 501 after which at step 503 the process establishes contact between communications units on a first service provider such as a WAN cellular provider. This step may initiate a communications exchange such as a voice call or the like between the communications unit and a second communications unit using the first service provider. The particular procedures for establishing the contact will vary depending on the protocols and standards employed by the particular service provider but are generally known and will not be further discussed.

Next step 505 determines or ascertains what communications services are required for a further communications exchange between the communications unit and the second communications unit. For example, this may include picture transfer or large database transfer or perhaps video services in which case suitable communications services will be needed at each communications device.

Thereafter step 507 is directed to discovering communications services available from a second service provider, such services suitable for use by the communications unit and the second communications unit. This operation or process step may be performed by a communication server via database lookup, interactions with other servers, etc., on behalf of one of the communications unit or second communications unit, or may rely on the respective communications units to find available services according to the appropriate discovery protocols and procedures for various service providers.

Then step 509 selects the communication services from the first service provider and the second service provider, the communications services selected in accordance with the communications services required for the communications exchange and preferably in view of the relative QoS, bandwidth, costs of such services and the application and user I/O capabilities of the participating communication units. Again this step may be performed by or facilitated by a communications server on behalf of one of the communication units and steps 507 and 509 may be performed concurrent with setting up an initial exchange on the first service provider or after that exchange has been ongoing. For example in the midst of a voice call you want to forward a video clip.

Then step 511 depicts authorizing access and authentication of the communications units for at least the secondary service providers as well as billing the respective units for services used. This step is optional but would be included for example when a third party reseller facilitated the use of a particular service for a unit that may not otherwise be authorized for access.

Figure 6:
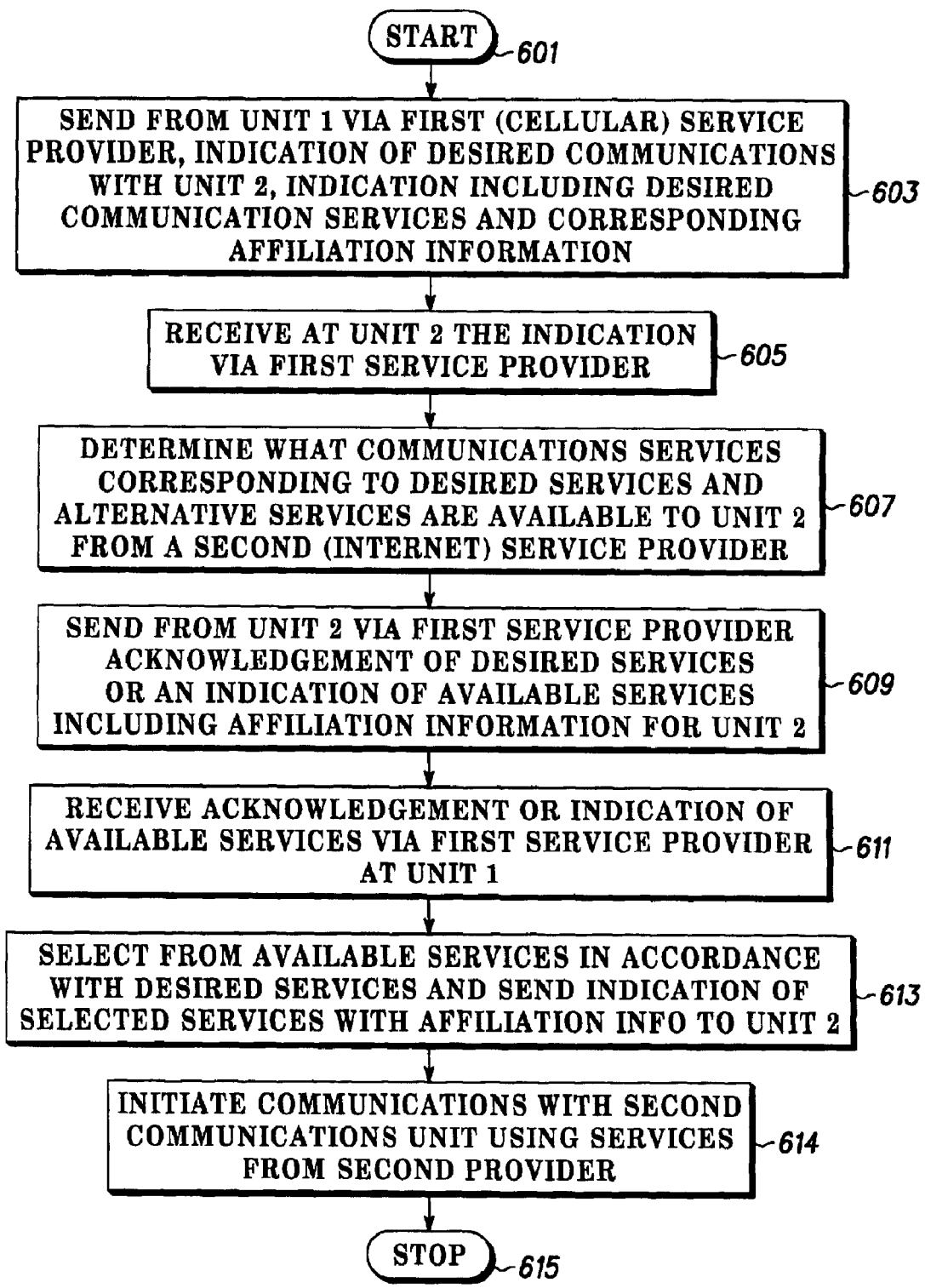
FIG. 6 depicts a further process flow chart of a method of providing communications services in accordance with the present invention.

Referring to FIG. 6 a process flow chart of a further method embodiment of facilitating communications services for a communications unit is depicted. The communications services are selected from a plurality of communications service providers and the method begins at 601. Step 603 denotes sending from the communications unit to a second communications unit or a communications server using a first service provider, an indication of a desired communications between the units. This indication may further include an indication of desired communications services and corresponding affiliation information.

Step 605 shows receiving, using the first service provider possibly by way of a communications server, at the second communications unit this indication. Note many of the process steps may be undertaken while the communications unit and the second communications unit are participating in a previously established call. Next step 607 depicts determining what communications services in accordance with the indication of desired services or alternative communications services are available, to the second communications unit from a second service provider. The second service providers may be one or more of an internet service provider, a local area network provider, a broadband service provider, and a 3G service provider or the like. Then step 609 depicts sending from the second communications unit, using the first service provider, an acknowledgment of the desired services or an indication of all available services including corresponding affiliation information for the second unit. Step 611 shows receiving acknowledgement or indication of available services via the first service provider at the first communications unit. Step 613 depicts selecting, at the first communications unit, from the available communications services according to the desired communications services and sending an indication of selected services with corresponding affiliation information back to the second communications unit. Step 614 indicates that communications is initiated with between the communications units using services selected from the second provider and the process stops at 615.

As noted generally above, a communications unit, as depicted in FIG. 3 or generally in FIG. 1 or 2 in accordance with the present invention, is contemplated that is arranged and operable for selecting communications services from a plurality of communications service providers. The unit includes a user interface and coupled thereto a transceiver and a controller. Preferably the controller executes software instructions that result in the unit using the communications services from among those available via a plurality of service providers to efficiently and effectively complete a communications exchange with another communications unit. For the sake of brevity and avoiding the risk of unduly obscuring the principles and advantages of the present invention, the specifics of these software programs or instructions are not further discussed here. It is recognized that these software instructions may vary dramatically depending on the particulars of the controller and communications unit as well as what communications services may be available or taken advantage of. It is further recognized that development of this software may be time consuming, require significant effort, and involve numerous design choices. However, such development in view of the inventive principles disclosed would be well within the wherewithal of one of ordinary skill.

To appreciate the full advantages and scope of the present invention the reader must be aware of numerous aspects, advantages, and embodiments thereof. For example the operation of the communications unit will vary depending on whether the unit is the originating unit or the recipient or target or terminating unit of a communications attempt, session or exchange. Furthermore the operation and configuration of the unit will vary dependent on whether a network centric or unit centric embodiment is utilized. In the former each unit will communicate wholly or mostly with a communications server for the purposes or establishing and maintaining a session while in the latter the units will exchange information between themselves for such activities. Of course a hybrid arrangement may exist where one of the units operates from a unit centric perspective while the other unit utilizes the server or relies on the network centric view or either unit may rely on the communications server and each other in part.

For example, referring to FIG. 2, suppose communications unit 2 204 is a file storage server and communications unit 1 202, specifically the user thereof as indicated by input from the user interface, wishes to download a large file (video or several pictures) from this server. Communications unit 1 is further only aware of or able to discover or gain access to this server 204 by way of the service provider 1 or GPRS path. Communications unit 1 would, likely by way of a Service Initiation Protocol (SIP) command or H.323 command or the like, request certain communications services of communications unit 2 or in this example preferably the communications server 226. Communications unit 2, the file server, if contacted could make unit 1 or the communications server 226 aware of service provider 3 210 including affiliation information required by unit 1 to contact unit 2 by this route or of service provider 2. Alternatively communications server 2 by a database would be aware of the service provider 2 route for unit 2 and so inform unit 1. If the issue was one of access authorization, authentication, or billing for the communication services of service provider 2 the communications server 226 can act as a reseller and provide access authentication etc. services for unit 1 or 2.

In any event as indicated above generally and again with reference to FIG. 5 and 6, certain functions, operations, procedures, etc. should take place in order to realize the full advantages and understand the full scope of the present invention. Generally a first service provider, such as a cellular or GSM or someday GPRS provider, that is widely deployed and is adapted to establish, control, and maintain a connection with a communications unit regardless of present and varying location (mobility management issues) will be used to initiate or establish a communications contact. Thereafter whenever additional services are required or indicated by either end point communications unit the first service provider may be used to facilitate services from other service providers. It is expected that these other service providers, such as various 3G systems, broadband systems, LAN connections to the internet, etc., while offering significantly greater bandwidth or QoS will not be as widely deployed or available or as adept at handling mobility concerns.

Essential activities to take advantage of communications services from a plurality of service providers for an exchange between communications units include in varying order initiating or establishing an initial contact or call request including sending and receiving the request at respective units. Further is assessing, determining, etc. what communications services are available that will or will best satisfy the needs of a communications exchange between the units. This would preferably include determining what communications services are desired and further what communications services are available from all service providers for the exchange from either units perspective. Then a negotiation process culminating in selection of communications services and providers and attachment or affiliation by both units with appropriate service providers for the selected services would be undertaken.

The determination of desired services should include an exchange, sending and acknowledging, between the units including the desired communications services information as well as affiliation information required by the one, usually recipient, to contact the other, normally originator. The recipient unit would discover or determine available communications services that match or are suitable for providing the service that is required. It is understood that desired services would not normally be communicated to a recipient unit until such services have been determined to be available for and by the originating unit or a communications server on behalf of the originating unit. If a match is found or perhaps to the extent a match is determined this information along with affiliation info required by the originating unit to contact the recipient would be forwarded in an acknowledgment or reply message, to the originator. Alternatively all available services at the recipient and relevant affiliation info is forwarded to and the originator can then select services to be used. Whatever communications services and relevant service providers are finally selected a further exchange of information will be required pursuant to setting up or initiating the communications session.

In conclusion various apparatus and methods of selecting communications services for a communications unit from a plurality of communications service providers have been discussed and described. Generally this includes some form of communicating between the communications unit and a second communications unit over a Wide Area Network (WAN) service provider with or without the facilitating services of some form of network server. Thereafter or concurrently communications services from a Wireless Local Area Network (WLAN) service provider are selected for at least one of the communications units again with or without the aid of a communications server. When a communications server is utilized, particularly for selecting the WLAN services, there will be exchange between the communications server and the one of the communications units. The communications server can be particularly advantageous for facilitating one or more of authorization, authentication, and billing services for the communications units that need the communications services from the WLAN or WAN but do or would not otherwise have access to such services. For example it may be that a user or communications unit only subscribes to the services of a reseller and depends thereon for access to all communications services.

It is understood that an exchange may be ongoing when it is discovered or determined by either unit that further communications services would be advantageous in which case the above relevant processes would be undertaken. It is further understood that many of or at least to the extent that the alternative service providers lack mobility management capability that the above processes may need to be undertaken repetitively in a given communications exchange. For example most of the presently known WLAN internet access services such as Bluetooth or Home RF access points do not have any way of handling situations where a communications unit travels beyond the coverage range of a particular access node or point or unit. In that case the link is simply dropped and it is up to the unit desiring services to reestablish a link if appropriate. It may be advantageous for this reestablishment activity to take place using or be facilitated by the WAN service provider in view of the capabilities of those networks.

Various inventive apparatus and method embodiments have been disclosed and described whereby communications services are selected from those available from a plurality of service providers, the selection advantageously using the relative strengths and traversing the relative weaknesses of each provider. The disclosed embodiments are by way of example only and are in no way intended to limit the scope or spirit of the claimed invention. It is expected and intended that only the appended claims including any amendments that may be made to such claims and all equivalents thereof will define the true scope, extent, and spirit of the present invention.

What is claimed is:

1. A method of facilitating communication services for a communications unit such services selected from a plurality of communications service providers, the method including the steps of:

receiving, at the communications unit using a first service provider, an indication of a desired communications and an indication of second communication services desired by a second communications unit;

determining, in accordance with said indication, first communications services available to the communications unit from a second service provider; and sending, using said first service provider, an indication of said first communications services to a second communications unit.

2. The method of claim 1 wherein said step of receiving further includes receiving first affiliation information corresponding to said second communications services.

3. The method of claim 1 wherein said step of sending further includes sending an acknowledgement of said second communications services together with second affiliation information corresponding to said second communications services.

4. The method of claim 1 wherein said step of sending further includes sending an indication of communications services corresponding to said second communications services and alternative services, all such communications services available to the communications unit.

5. The method of claim 4 wherein said step of sending further includes sending second affiliation information corresponding to said all such communication services.

6. The method of claim 4 further including a step of receiving an indication of third communications services selected by said second communications unit.

7. The method of claim 6 wherein said step of receiving said indication of said third communications services selected by said second communications unit further includes receiving affiliation information for said third communications services.

8. The method of claim 1 wherein said step of receiving an indication of a desired communications uses one of a cellular phone service provider or paging service provider; and said step of determining said first communications services available from a second service provider includes determining communications services available from one of an internet service provider, a local area network provider, a broadband service provider, and a 3G service provider.

9. The method of claim 1 wherein said step of receiving occurs while the communications unit and said second communications unit participate in a previously established call.

10. A method of facilitating communication services for a communications unit, such services selected from a plurality of communications service providers, the method including the steps of:

sending, to a second communications unit using a first service provider, an indication of a desired communications;

determining, in accordance with said indication, first communications services available to said second communications unit from a second service provider; and initiating communications with said second communications unit using said first communications services available from said second service provider.

11. The method of claim 10 wherein said step of sending further includes sending an indication of second communications services desired by the communication unit to one of said second communications unit or a communications server.

12. The method of claim 11 wherein said step of sending further includes sending affiliation information corresponding to said second communications services.

13. The method of claim 11 wherein said step of determining further includes a step of receiving an acknowledgement of said second communications services together with affiliation information corresponding to said second communications services.

14. The method of claim 11 further including a step of receiving an indication of communications services corresponding to said second communications services and alternative services, all such communications services available to said second communications unit.

15. The method of claim 14 wherein said step of receiving further includes receiving second affiliation information corresponding to said all such communications services.

16. The method of claim 14 further including a step of sending an indication of third communications services selected by the communications unit to said second communications unit.

17. The method of claim 16 wherein said step of sending an indication of third communications services further includes sending affiliation information for said third communications services selected by the communications unit.

18. The method of claim 10 wherein said step of sending an indication of said desired communications uses one or a cellular phone service provider or a paging service provider, and said step of determining first communications services from said second service provider includes determining communications services available from one of an internet service provider, a local area network provider, a broadband service provider, and a 3G service provider.

19. A method of selecting communications services for a communications unit, such services selected from a plurality of communications service providers, the method including the steps of:

establishing contact between the communications unit and a second communications unit using a first service provider;

determining communications services required for a communications exchange between the communications unit and said second communications unit discovering communications services available from a second service provider, such services suitable for use by the communications unit and said second communications unit;

selecting the communication services from said first service provider and said second service provider, the communications services selected in accordance with said communications services required for a communications exchange.

20. The method of claim 19 wherein said step of discovering and selecting is undertaken by a communications server.

21. The method of claim 20 wherein said step of selecting is undertaken by said communications server based on one of available bandwidth and cost for said communication services.

22. The method of claim 19 wherein said steps of discovering and selecting are undertaken after said communications exchange has been initiated using said first service provider.

23. The method of claim 11 wherein said steps of discovering and selecting are undertaken by said communications server on behalf of one of said communications unit and said second communication unit.

24. The method of claim 23 further including steps of authenticating and authorizing one of said communications unit and said second communications unit to use said communications services.

25. The method of claim 23 further including a step of billing one of said communications unit and said second communications unit for use of said communications services.

26. A communications unit arranged for selecting communications services from a plurality of communications service providers, including in combination:
a user interface for accepting input indicative of desired communications services; and
a transceiver and a controller, coupled to said user interface, operable for:
discovering first communications services available from a second service provider for a second communications unit,
establishing, using a first service provider, a communications link between the communications unit and said second communications unit, and
sending an indication of said desired communications services for a communications exchange between the communications unit and said second communications unit.

27. The communications unit of claim 26 wherein said controller selects the communication services from said first service provider or said second service provider, the communications services selected in accordance with said desired communications services and controls said transceiver to initiate communications with said second communications unit using the communications services.

28. The communications unit of claim 26 wherein said transceiver sends said indication of said desired communications services and first affiliation information to one of said second communications unit or a communications server.

29. The communications unit of claim 28 wherein said transceiver receives an acknowledgement of said desired communications services together with second affiliation information corresponding to said desired communications services.

30. The communications unit of claim 26 wherein said transceiver receives an indication of communications services corresponding to said desired communications services and alternative services, all such communications services available to said second communications unit.

31. The communications unit of claim 30 wherein said transceiver further sends an indication of second communications services selected by the communications unit to said second communications unit.

32. The communications unit of claim 26 wherein said transceiver:
sends said indication of said desired communications services using one of a cellular phone service provider and a paging service provider; and
discovers said first communications services available from one of an internet service provider, a local area network provider, a broadband service provider, and a 3G service provider.

33. A communications unit arranged for selecting communications services from a plurality of communications service providers, including in combination:
a user interface for providing user output and accepting input relevant to communications services; and
a transceiver and a controller, coupled to said user interface, operable for:
receiving, using a first service provider, an indication or a desired communications for a communications exchange between the communications unit and a second communications unit;
discovering first communications services available from a second service provider for the second communications unit,
sending an indication of said first communications services to said second communications unit.

34. The communications unit of claim 33 wherein said transceiver further sends an acknowledgement or said desired communications together with second affiliation information corresponding to said first communications services.

35. The communications unit of claim 33 wherein said transceiver sends an indication of communications services corresponding to said desired communications services and alternative services, all such communications services available to the communications unit.

36. The communications unit of claim 35 wherein said transceiver receives an indication of communications services selected by one of said second communications unit or a communications server.

37. A communications unit arranged for selecting communications services from a plurality of communications service providers, including in combination:
a user interface for providing user output and accepting input relevant to communications services; and
a transceiver and a controller, coupled to said user interface, operable for:
receiving, using a first service provider, an indication of a desired communications for a communications exchange between the communications unit and a second communications unit;
discovering first communications services available from a second service provider for the communications unit;
sending an indication of said first communications services to said second communications unit;
sending an acknowledgement of said desired communications together with second affiliation information corresponding to said first communications services;
sending an indication of communications services corresponding to said desired communications services and alternative services, all such communications services available to the communications unit;
receiving an indication of communications services selected by one of said second communications unit or a communications server; and
receiving said indication of said desired communications using one of a cellular phone service provider and a paging service provider; and discovers communications services available from one of an internet service provider, a local area network provider, a broadband service provider, and a 3G service provider.

38. A communications server arranged for selecting communications services from a plurality of communications service providers, including in combination:
a processing unit; and
a memory operably coupled to the processing unit, wherein the memory stores programming instructions that, when read by the processing unit, causes the processing unit to;
a) receive, using a first protocol of a first service provider, an indication of a desired communications from a communication unit,
b) establish, responsive to said indication and using said first protocol, contact with a second communication unit, c) determine, responsive to said indication, first communication services desired for a communication exchange between the communications unit and said second communications unit, d) discover what second communications services, using a second protocol of a second service provider, are available to said second communications unit, and e) select the communications services using said first protocol and using said second protocol to support said communications exchange between the communications unit and said second communications unit.

39. The communications server of claim 38 wherein said processing unit further receives a response from said second communications unit and sends a response to the communication unit using said first protocol.

40. The communications server of claim 38 wherein said processing unit further receives a response from said second communications unit and sends a response to the communication unit using said second protocol.

41. The communications server of claim 38 wherein said processing unit establishes, responsive to said indication and using said first protocol, contact with a plurality of communications units.

42. The communications server of claim 38 wherein said processing unit further determines said first communications services by analysis of said indication of a desired communications.

43. The communications server of claim 38 wherein said processing unit further determines said first communications services by analysis of one of user preferences and type of information to be communicated.

44. The communications server of claim 38 wherein said processing unit further discovers said second communications services by interrogation of each participating unit to determine what third communications services are available locally to said each participating unit and identifying a set of communications services that are compatible with said third communications services.

45. The communications server of claim 38 wherein said processing unit further discovers said second communication services by facilitating an information exchange regarding locally available services between said communications unit and said second communications unit.

46. The communications server of claim 38 wherein said processing unit further selects the communications services based upon; knowledge of information to be communicated, a set of communications services available to the communications unit and said second communications unit, and preferences of users of the communications unit and said second communications unit.

47. A method of selecting communications services for a communications unit from a plurality of communications service providers including the steps of;

communicating with a second communications unit over a Wide Area Network (WAN) service provider, and selecting communications services from a Wireless Local Area Network (WLAN) service provider for one of the communications unit and said second communications unit.

48. The method of claim 47 wherein said step of selecting further includes an exchange with a communications server and one of the communications unit and said second communications unit.

49. The method of claim 48 wherein said exchange with a communications server facilitates one of authorization, authentication, and billing services for one of the communications unit and said second communications unit for use of the communications services from one of said WLAN and said WAN.

* * * * *

UNITED STATES PATENT AND TRADEMARK OFFICE
CERTIFICATE OF CORRECTION

PATENT NO. : 6,879,584 B2 Page 1 of 1
DATED : April 12, 2005
INVENTOR(S) : Thro, Stuart Wells et al.

It is certified that error appears in the above-identified patent and that said Letters Patent is hereby corrected as shown below:

Column 16,
Line 23, delete "or" and replace with -- of --

Column 17,
Line 64, delete "or" and replace with -- of --

Column 18,
Line 7, delete "or" and replace with -- of --

Signed and Sealed this

Twenty-eighth Day of June, 2005

JON W. DUDAS
*Director of the United States Patent and Trademark Office*